United States Patent
Iyer et al.

(10) Patent No.: US 10,860,181 B1
(45) Date of Patent: Dec. 8, 2020

(54) DISPLAYING ACTIONABLE GRAPHICAL USER INTERFACE (GUI) OBJECTS ON A PAGE WITH A PARTICULAR ACTIONABLE GUI OBJECT IN A MODAL WINDOW

(71) Applicant: Amazon Technologies, Inc., Seattle, WA (US)

(72) Inventors: Apoorva Iyer, Bellevue, WA (US); Jacquelyn Loven, Seattle, WA (US); Matthew Prete, Seattle, WA (US); Jeffrey Rosenberg, Seattle, WA (US); Josh Sternberg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 16/219,683

(22) Filed: Dec. 13, 2018

(51) Int. Cl.
| | | |
|---|---|---|
| *G06F 3/048* | (2013.01) | |
| *G06F 3/0483* | (2013.01) | |
| *G06F 3/0484* | (2013.01) | |
| *G06F 16/955* | (2019.01) | |
| *G06F 3/0482* | (2013.01) | |
| *G06F 16/9538* | (2019.01) | |
| *G06F 16/957* | (2019.01) | |

(52) U.S. Cl.
CPC .......... *G06F 3/0483* (2013.01); *G06F 3/0482* (2013.01); *G06F 3/04845* (2013.01); *G06F 16/9538* (2019.01); *G06F 16/9558* (2019.01); *G06F 16/9577* (2019.01)

(58) Field of Classification Search
None
See application file for complete search history.

(56) References Cited

U.S. PATENT DOCUMENTS

| | | | | |
|---|---|---|---|---|
| 10,672,059 B2* | 6/2020 | Dhar | ...................... | G06Q 50/01 |
| 2013/0110671 A1* | 5/2013 | Gray | ...................... | G06Q 30/06 705/26.8 |
| 2013/0290133 A1* | 10/2013 | Schreck | ............. | G06Q 30/0633 705/26.8 |
| 2014/0229270 A1* | 8/2014 | Rashwan | ........... | G06Q 30/0641 705/14.43 |
| 2016/0140622 A1* | 5/2016 | Wang | .................. | G06F 16/9577 705/14.66 |
| 2018/0108054 A1* | 4/2018 | Doubinski | ............ | G06F 3/0482 |
| 2019/0303413 A1* | 10/2019 | Colangelo | ............... | G06F 16/94 |

* cited by examiner

*Primary Examiner* — Thanh T Vu
(74) *Attorney, Agent, or Firm* — Kilpatrick Townsend & Stockton LLP

(57) ABSTRACT

Techniques for updating a graphical user interface (GUI) are described. In an example, a system provides, to a user device, a GUI element about an item and linked to a page. The user device is associated with a user account. Based on a selection of the GUI element, the system provides the page to the user device for presentation in the GUI. The page is configured to present one or more GUI objects in a main window, where these GUI objects are associated with one or more items based at least in part on the user account. The page is also configured to overlay a modal window over at least a portion of the main window. The modal window is configured to present a GUI object corresponding to the item. The web page is also configured to dismiss, based on a user interaction, the modal window.

20 Claims, 10 Drawing Sheets

DISPLAYING ACTIONABLE GRAPHICAL USER INTERFACE (GUI) OBJECTS ON A PAGE WITH A PARTICULAR ACTIONABLE GUI OBJECT IN A MODAL WINDOW

BACKGROUND

Web servers are commonly used to provide information to user devices. For example, a web page is sent from a web server to a user device, where the web page presents information about items. A user may be interested in performing an action specific to one of the items. To do so, the user typically navigates through multiple web pages to land on a particular web page that facilitates the action, where these web pages are provided from the web server and presented on the user device.

BRIEF DESCRIPTION OF THE DRAWINGS

Various embodiments in accordance with the present disclosure will be described with reference to the drawings, in which.

DETAILED DESCRIPTION

Figure 1:
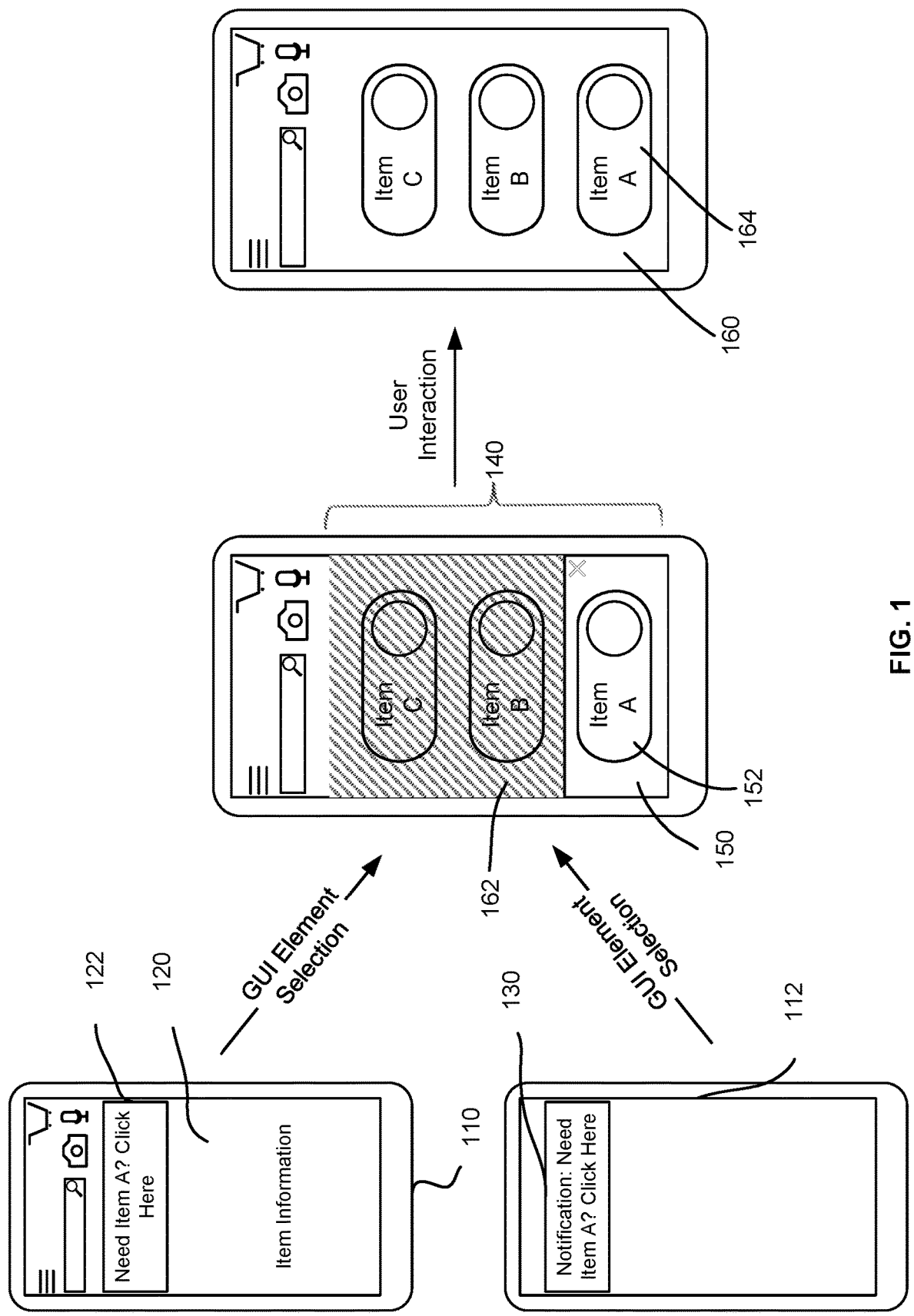
FIG. 1 illustrates example user interfaces for navigating to a page presenting graphical user interface (GUI) objects, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, improving the navigation between pages provided by a computer resource. In an example, a user device may be in communication with the computer resource over a network. Based on a user account associated with the user device, the computer system may infer an interest of a user in a particular item and a potential interest in other items. Each of these items may be associated with a graphical user interface (GUI) object selectable for automatically performing an action on the corresponding item. The GUI object may include a selectable control that triggers the performance of an action based on a user interaction with the selectable control, where the performance may be automatic without additional user interactions at the user device specific to this performance. The GUI object may also include an information section that may present information about the item and that may, but need not, be selectable based on a user interaction to trigger the presentation of additional information about the item. The computer system may generate and send a GUI element to the user device, where the GUI element identifies the particular item. Upon receiving a selection of the GUI element from the user device, the computer system may send a page to the user device, where the page may present the GUI objects in a main window and the GUI object corresponding to the particular item in a modal window. The modal window may be overlaid over at least a portion of the main window such that the main window is disabled, while some of the GUI objects are visible and other ones are obstructed by the modal window. Upon a user selection of the GUI object in the modal window, the computer system may automatically initiate the action and update the user account accordingly. The GUI object in the modal window and the main window may also be updated based on the action. Upon a dismissal of the modal window, the main window may be enabled and the GUI objects may become actionable. In this way, the user need not navigate through multiple pages to perform an action on the item of interest or any of the other items. Instead, the GUI objects presented in the page may be sufficient for the action.

To illustrate, consider an example of a web site that offers many different items, where the web site is hosted on a web server, and where a user may have a user account to obtain the items. Upon access to the web site, the web server may identify an item of interest to the user based on an order history of the item. In addition to storing the order history, the user account may associate items with GUI reorder shortcuts. A GUI reorder shortcut is an example of a GUI object, where a selection of the control of this object may trigger a reorder of the associated item. The term "shortcut" is used to refer to the fact that the reordering process has been shortened (or has been completely automated) and need not necessitate the user to go through multiple web page to complete the order. Each GUI reorder shortcut may be configured to, upon selection, place an automatic order for the associated item. The web server may provide a GUI element about the item of interest in a banner space on the web site. Upon selection of this element, the web server may provide a web page that presents some of the GUI reorder shortcuts. In particular, the GUI reorder shortcut corresponding to the item of interest may be presented in a modal window, while other GUI reorder shortcuts may be presented in a main window. The user may click on the GUI reorder shortcut in the modal window to automatically reorder the item. Additionally, the user may dismiss the modal window to then click on any of the other GUI reorder shortcuts to place a corresponding item reorder. In this way, the user need not navigate between multiple web pages to order items. In particular, rather than having to start from a home page and navigate, for each item, to a corresponding item page and then to an order page, it is sufficient to click on the GUI element and interact with the GUI reorder shortcuts on the single web page.

In the interest of clarity of explanation, embodiments of the present disclosure are described in connection with GUI reorder shortcuts associated with items available based on a web site. However, the embodiments are not limited as such. Instead, the embodiments may also be implemented for any GUI objects associated with items available based on one or more computer resources. Generally, a GUI object associated with an item available from a computer resource may represent an object presentable at a page in a GUI and configured to trigger an automatic action supported by the computer resource. For example, a GUI object may be used to order an item for a first time, rather than for merely a reorder. In another example, a GUI object may be used to play a music file or initiate a reading of an audible book.

Embodiments of the present disclosure provide many technological advantages over existing systems for providing information to user devices, including web-based information. In particular, by inferring user interest from a user account and using of GUI objects, the navigation between pages available from the computer resource may be significantly reduced because the GUI objects may be presented in a single page and support one or more actions. Further, by reducing the amount of pages that should be navigated to trigger any of the one or more actions, the usage of the network bandwidth between the computer resource and the user device may be reduced.

FIG. 1 illustrates example user interfaces for navigating to a page presenting graphical user interface (GUI) objects, according to an embodiment of the present disclosure. In an example, a user device 110 may present a graphical user interface (GUI) 112 to a user. The GUI 112 may allow a user to navigate to a page 140 presenting multiple GUI reorder objects.

As illustrated, different ways may be possible to trigger the navigation to the page 140. In a first example, a GUI element 122 is presented in a web page 122 of a web site of a service provider, identifies an item (e.g., by describing the item with text, image, graphic, video, or multimedia), and is linked to the page 140. The item may be an item of interest to a user of the user device. A user selection of the GUI element 122 may trigger the presentation of the page 140.

In particular, the web site may offer items, where item information may be available and functionalities to obtain the items may be presented in web pages of the web site. In this example, the user device 110 may access the web page 120 from a web server of the service provider. The GUI 112 may present the web page 120. This web page 120 may provide information about one or more items (e.g., a description of an item, an item price, an item review, etc.) and the related functionalities (e.g., some of these functionalities include browsing, searching, and adding items to a virtual cart as shown in the top part of the web page 120). The web page 120 may also include a space, such as a banner space, that presents the GUI element 122. The GUI element 122, as presented, may be actionable, where a user selection of the GUI element 122 may be received by the user device 110 and sent to the web server. In response, the web server may refresh the GUI 112 to present the page 140 based on the link between the GUI element 122 and the page 140.

In a second example, a GUI element 130 is presented as a notification in the GUI 112. Here also, this GUI element 130 may be linked to the page 140 and may identify the item. In particular, the user device may host and run an application of the service provider, where this application may provide access of the item information and the related functionalities. The web server may send the notification to the user device 112. In response, the application may present the notification as the GUI element 130. According, and upon a user selection of the GUI element 130, the web server may refresh the GUI 112 to present the page 140.

In an example, the page 140 may be a web page that presents GUI reorder shortcuts according to a particular layout, where this layout may control how the GUI reorder shortcuts can be interacted with to trigger a predefined action(s). A GUI reorder shortcut may be a shortcut presentable at a GUI, associated with one or more predefined actions, and may trigger one or more actions of the predefined action(s) based on a user interaction therewith. The predefined actions may be based on a user account. For instance, the user account may associate a GUI reorder shortcut with a previously ordered item and may define parameters for reordering this item (e.g., quantity, size, shipping method, etc.). Hence, upon a selection of the GUI reorder shortcut, the previously ordered item may automatically be ordered again according to the parameters. A "Dash Button Shortcut," available from AMAZON of Seattle, Wash. U.S.A. is an example, of a GUI reorder shortcut. In the interest of clarity, this page 140 may be referred to as a shortcut page.

As illustrated, the layout may organize the shortcut page 140 in a main window 160 and a modal window 150 overlaid over at least a portion of the main window 160. The modal window 150 may be implemented as a bottom sheet that appears from and is positioned near the bottom of the shortcut page 140.

In an example, the main window 160 may present different GUI reorder shortcuts, where these shortcuts may be identified from the user account. In comparison, the modal window 150 may be a provide a scripted effect for a graphical control element subordinate to the main window 160. Based on this effect, the modal window 150 may disable the main window 160 while retaining the remaining portion 162 of the main window 160 visible (this portion 162 is shown with dashed lines to indicate that the portion 162 may be grayed out). The control may allow user interactions with the modal window 150, but not with the main window 160 until the modal window 150 is dismissed. The dismissing of the modal window 150 causes the main window 160 to be enabled and the GUI reorder shortcuts on this window 160 may become actionable (e.g., selectable to trigger a predefined action(s)).

As explained herein above, the GUI element 122 or 130 used to navigate to the shortcut page 140 may identify an item (shown as "item A"). The modal window 150 may present a GUI reorder shortcut 152 associated with that item (shown as "item A"). From the modal window 150, the GUI reorder shortcut 152 may be selected to trigger an automatic reorder of the item.

In addition, the modal window 150 may hide a same GUI reorder shortcut 164 for the item, where this shortcut 164 may be presented in the main window 160. The GUI reorder shortcut 164 may be associated with the same item (e.g., shown as "item A"), have the same look and feel as the GUI reorder shortcut 152, and support the same predefined action(s). Upon the dismissing of the modal window 150, the GUI reorder shortcut 164 may become visible (e.g., would be presented to the user) in the main window 160 and may become actionable from this window 160.

Accordingly, the layout may control the presentation of the shortcut page 140 on the GUI 112. Upon the trigger to navigate to the shortcut page (e.g., based on a user selection of the GUI element 122 or 130), the shortcut page 140 may be presented as including an overlay of the modal window 150 of the main window 160. The GUI reorder shortcut 152 may be the only actionable item, until dismissal of the modal window 150. Upon a user interaction that dismisses the modal window 152 (e.g., by selecting a "close button" in the modal window 152, swiping the modal window 150 in a particular direction, or clicking on the remaining, visible portion 162 of the main window 160), the modal window 150 may be dismissed and all GUI reorder shortcuts may become visible and actionable from the main window 160 of the shortcut page 140. Alternatively or additionally, the modal window 152 may be automatically dismissed (e.g., absent a user interaction for the dismissal) once the user interacts with the GUI reorder shortcut 152 to trigger an action (e.g., by clicking or tapping on the GUI reorder shortcut 152) or after an elapse of a predetermined amount of time. In both cases, the user may quickly navigate to the shortcut page 140, trigger an action by using a GUI reorder shortcut from a modal window of the shortcut page 140 corresponding to an item of interest to the user, and perform additional actions by using GUI reorder shortcuts from a main window of the shortcut page 140 corresponding to other potential items of interest. In other words, rather than having to navigate to particular web pages specific to each of such items, the navigation to the shortcut page 140 may be sufficient.

Figure 2:
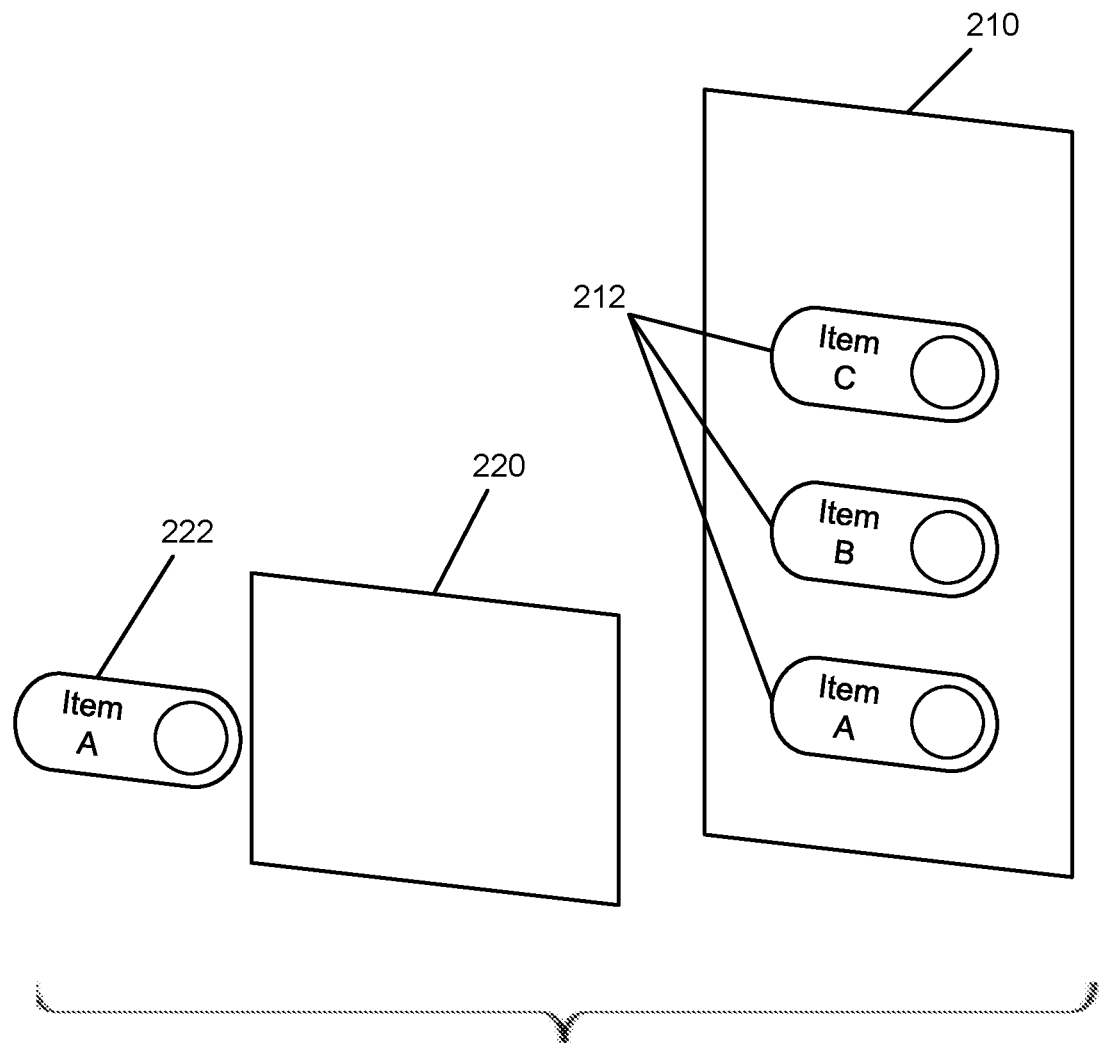
FIG. 2 illustrates an example page that presents GUI objects, according to an embodiment of the present disclosure.

FIG. 2 illustrates an example page 200 that presents GUI objects, according to an embodiment of the present disclosure. This page 200 may be a shortcut page similar to the shortcut page 140 of FIG. 1. As illustrated, the shortcut page 200 may include a main window 210 and a modal window 220. In turn, the main window 210 may include GUI reorder shortcuts 212. In comparison, the modal window 220 may include a GUI reorder shortcut 222. Upon a presentation of the shortcut page 200, the GUI reorder shortcut 222 may be presented in the modal window 220, while this modal window 220 may be overlaid over a portion of the main window 210. Some of the GUI reorder shortcuts 212 that are not occluded by the modal window 220 may be visible, but not actionable from the main window 210. Upon the dismissal of the modal window 220, all of the GUI reorder shortcuts 212 may become visible and actionable from the main window 210.

In an example, the shortcut page 200 may be defined in a document using a markup language, such as Hypertext Markup Language (HTML). The document may follow a document object model (DOM) that provides the layout and functionality of the shortcut page 200, including those of the windows 210 and 220 and the shortcuts 212 and 222. For instance, the main window 210 may be an object in the DOM and the GUI reorder shortcuts 212 may be objects nested within this object. The modal window 220 may be another object in the DOM nested within the object corresponding to the main window 210 and, possibly, other objects. These other objects may correspond to, for instance, information about the item associated with the GUI reorder shortcut 222 (e.g., "item A") such that, when the modal window is presented, item information may also be presented next to the GUI reorder shortcut 222. The modal window's 220 object may also include another DOM that in, turn, nests an object for the GUI reorder shortcut 222.

In addition, the shortcut page 200 may include one or more scripts controlling the presentation of the two windows 210 and 220 and updates to the presentations of the GUI reorder shortcuts 212 and 222. As further illustrated in the next figures, at least one of such scripts may be executed to synchronize the presentation of the GUI reorder shortcut 222 in the modal window 220 with a corresponding GUI reorder shortcut 212 in the main window 210 without the need to refresh the shortcut page 200.

Although FIG. 2 illustrates three GUI reorder shortcuts 212 (associated with an item A, an item B, and an item C) in the main window 210 and one GUI reorder shortcut 222 (associated with the item A) in the modal window 220, a different number and possible associations of GUI reorder shortcuts may be possible. For instance, the modal window 220 may present more than one GUI reorder shortcut. In another illustration, the GUI reorder shortcut(s) presented in the modal window 220 need not have a correspondence in the main window 210 (e.g., the modal window 220 may present a GUI reorder shortcut associated with an item D, whereas the main window 210 may not present a GUI reorder shortcut for such an item).

Generally, a user may add a GUI reorder shortcut associated with an item to their user account and may set parameters in the user account for using this shortcut to automatically order the item based on a user interaction with the GUI reorder shortcut. Accordingly, the user account may identify multiple GUI reorder shortcuts and the associated items. A selection may be made to present a subset of these shortcuts in the main window 210 and another subset in the modal window 220. For instance, based on an item having a GUI reorder shortcut in the user account and based on an order history of the item (e.g., the frequency of ordering the item, the last time an order for the item was placed, an expected time for placing a next order, an upcoming expiration date of the item, and/or other information related to past orders of the user for the item), a determination may be made that the item may be of a particular interest to the user. The GUI reorder shortcut of this item may be presented in the modal window 220. A similar determination may be made for other items based on these items having GUI reorder shortcuts in the user account and based on the corresponding order histories. The determined levels of interest of the user for such items may be used to rank them and a subset therefrom may be selected based on ranking. This subset may represent recommendable items to the user based on the corresponding GUI reorder shortcuts and order histories. The corresponding GUI reorder shortcuts may be presented in the main window 210.

Although FIG. 2 illustrates the modal window 220 as being overlaid over a bottom portion of the main window 210, other overlays may be possible. For instance, the modal window 220 may be shown at the top, the middle, or any other portion of the main window 210. The modal window 220 may also, but need not, be positioned to hide the corresponding GUI reorder shortcut in the main window 210 (e.g., if each of the main window 210 and the modal window 220 presents a GUI reorder shortcut for an item X, and if the main window 210 presents this item's GUI reorder shortcut in the middle, the modal window 220 may be overlaid over the middle of the main window 210).

Figure 3:
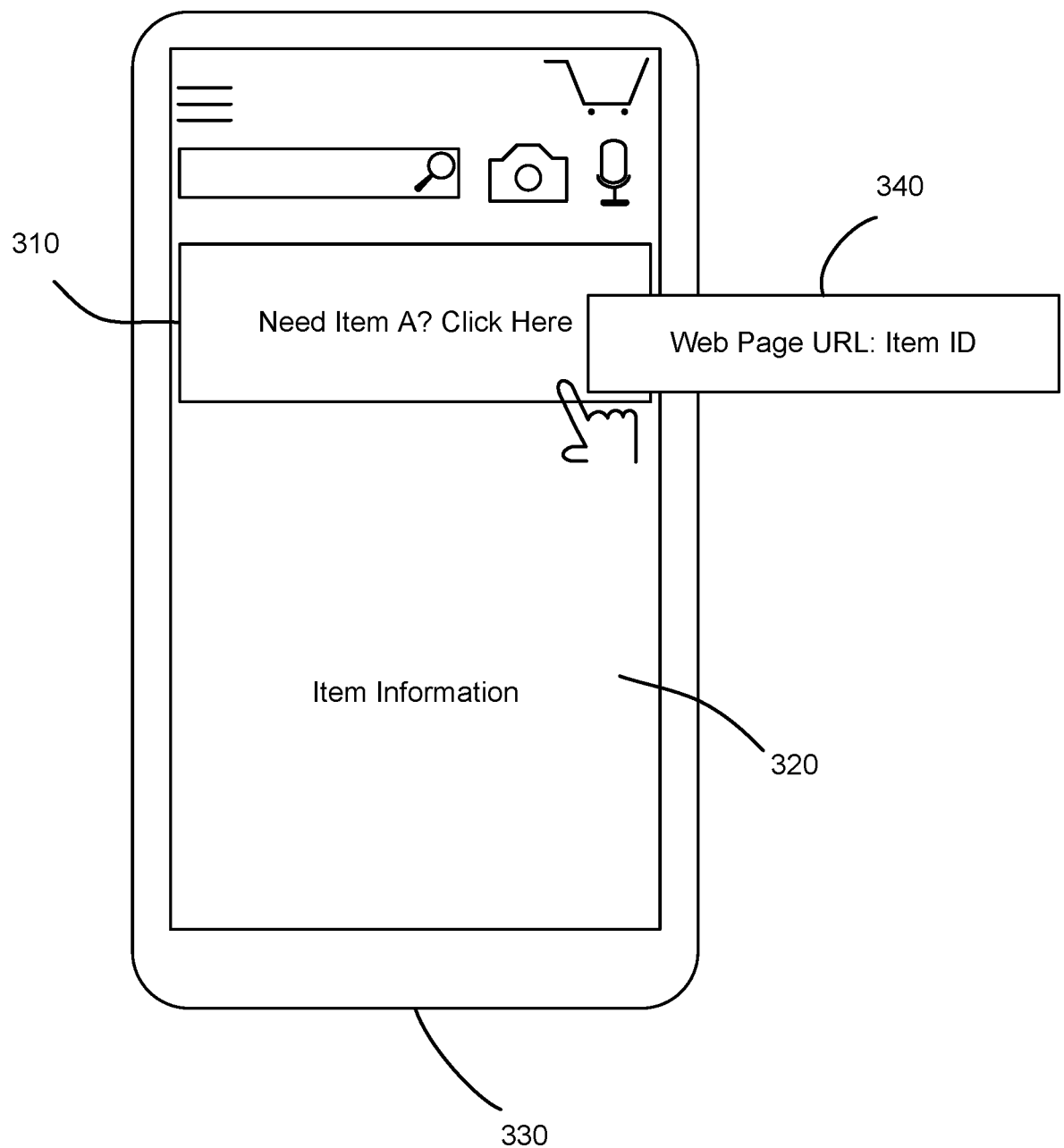
FIG. 3 illustrates an example GUI element that identifies an item and that is linked to a page presenting GUI objects, according to an embodiment of the present disclosure.

FIG. 3 illustrates an example GUI element 310 that identifies an item and that is linked to a page presenting GUI objects, according to an embodiment of the present disclosure. In an example, a determination may be made that the item may be of particular interest to a user based on a user account associating the item with a GUI reorder shortcut and on an order history of the item from the user account. The GUI element 310 may be accordingly presented on a GUI 320 of a user device 330. Upon a selection of the GUI element 310, the GUI 320 may be refreshed to present the shortcut page, including a modal window for a GUI reorder shortcut associated with the item.

In an example, the GUI element 310 may identify the item. For instance, the GUI element 310 may include a description of the item, such as a text, image, graphic, video, and/or multimedia description. In addition, the GUI element 310 may inform the user that it is clickable to perform an action on the item. For instance, the GUI element 310 may show an image of the item's GUI reorder shortcut.

The link 340 between the GUI element 310 and the shortcut page may include a uniform record locator (URL) of the shortcut page. In addition, the link 340 may include an identifier (ID) of the item. For instance, the ID may be appended to the URL and may uniquely identify the item. As illustrated in FIG. 3, upon a user hover over the GUI element 310, the link 340 may become visible. In addition, the link 340 may be visible in an address bar of a web browser of the user device 330.

Upon a user selection of the GUI element 310 (e.g., upon a mouse click, a finger tap, or a gesture over this element 310), a web server may receive a web request from the user device 330. The web request may include some or all the information from the link 340. For instance, the web request may include the URL of the shortcut page and the ID of the item. In this way, the web server may determine that the shortcut page is requested and that the modal window should present the item's GUI reorder shortcut. The web server may generate and/or update this shortcut page accordingly and may send it to the user device 330 for presentation in the GUI 320.

Figure 4:
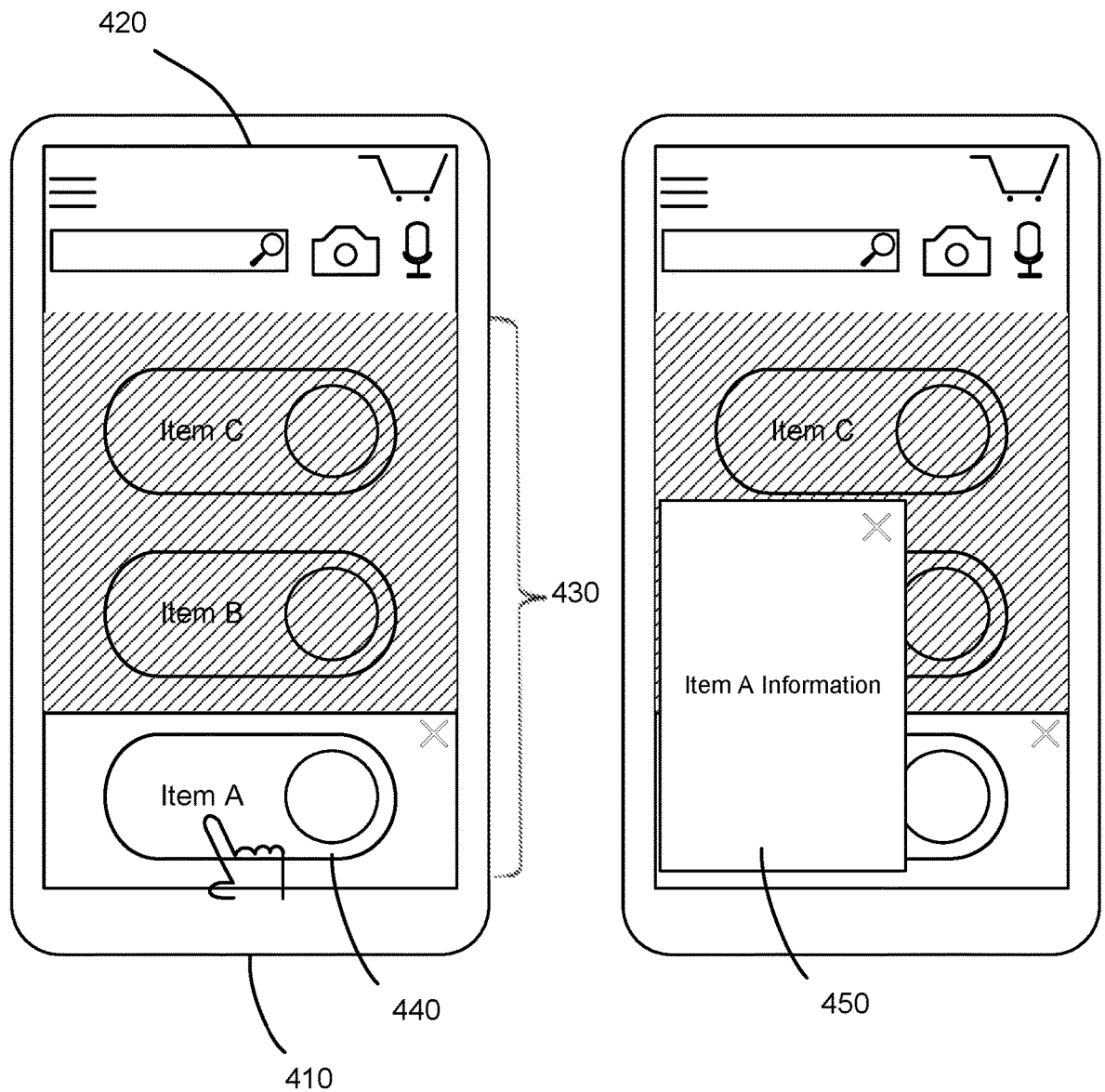
FIG. 4 illustrates an example user interface presenting information about an item based on a selection of a GUI object, according to an embodiment of the present disclosure.

FIG. 4 illustrates an example user interface presenting information about an item based on a selection of a GUI object, according to an embodiment of the present disclosure. As illustrated, a user device 410 may include a GUI 420 that presents a shortcut page 430. The shortcut page 430 may include a main window and a modal window. A GUI reorder shortcut 440 associated with an item may be presented and actionable in the modal window. Upon a specific user interaction with the GUI reorder shortcut 440, a second modal window 450 may be presented and include information about the item.

In an example, the GUI reorder shortcut 440 may include multiple portions. Some of the portions may be selectable to trigger a presentation of information related to items. Such portions may correspond to an information section(s) of a GUI object for presenting item information. As illustrated in FIG. 4, a first portion of the GUI reorder shortcut 440 may correspond to the elongated body of the GUI reorder shortcut 440 and may identify the item (e.g., may include a the item with text, image, graphic, video, and/or multimedia description of the item). A user selection of this first portion may trigger the presentation of the second modal window 450.

The second modal window 450 may be a child of the first modal window (the one showing the GUI reorder shortcut 440). Hence, the second modal window 450 may be overlaid over at least a portion of the first modal window and/or a portion of the main window and may disable these two windows until dismissal. The content of the second modal window 450 may provide additional descriptive information about the item, such as an item description, an item price, an item review, and the like. Although FIG. 4 illustrates the use of a second modal window 450 to present the additional descriptive information, other presentations of this information may be possible. For instance, the information may be presented next to the GUI reorder shortcut 440 in the first modal window (e.g., on top, at the bottom, to the left, or to the right of the the GUI reorder shortcut 440).

Figure 5:
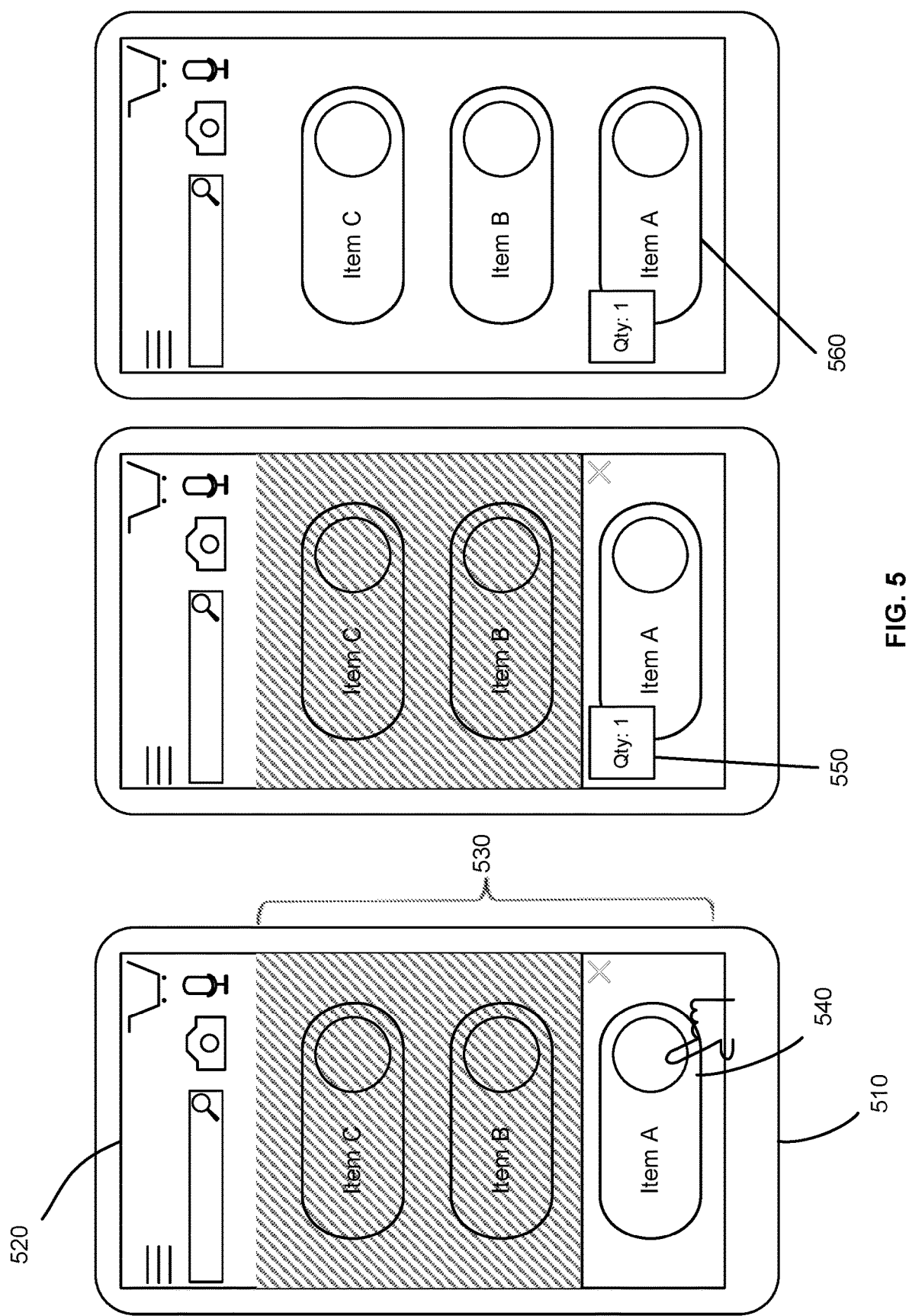
FIG. 5 illustrates an example user interface presenting a status about an action triggered based on a selection of a GUI object, according to an embodiment of the present disclosure.

FIG. 5 illustrates an example user interface presenting a status about an action triggered based on a selection of a GUI object, according to an embodiment of the present disclosure. As illustrated, a user device 510 may include a GUI 520 that presents a shortcut page 530. The shortcut page 530 may include a main window and a modal window. A first GUI reorder shortcut 540 associated with an item may be presented and actionable in the modal window. Upon a specific user interaction with the first GUI reorder shortcut 540, an action may be automatically triggered (e.g., a request to place an order for the item) and the presentation of the first GUI reorder shortcut 540 may be updated in the modal window to indicate a status 550 of this action. As illustrated in FIG. 5, the status 550 may show that a particular quantity of the item was automatically ordered. Other information related to the item and/or the triggered action may also be presented under the status 550 including, for instance, a delivery date, a delivery address and/or zip code, and the like. Furthermore, the status 550 need not be presented as partially overlapping with a portion of the GUI reorder shortcut 540. Instead, the status 550 may be presented in line with the GUI reorder shortcut 540, next to but not overlapping with the GUI reorder shortcut 540, or the information itself may be shown in the elongated body of the GUI reorder shortcut 540. Upon dismissal of the modal window, a second GUI reorder shortcut 560 also associated with the item may be presented and become actionable in the main window. The presentation of the second GUI reorder shortcut 560 may be synchronized with the presentation of the first GUI reorder shortcut 550, whereby the status 550 may be similarly indicated in the presentation of the second GUI reorder shortcut 560.

In an example, the first GUI reorder shortcut 540 may include multiple portions. Some of the portions may be selectable to trigger a particular action. Such portions may correspond to a selectable control(s) of a GUI object for triggering the particular action. As illustrated in FIG. 5, a second portion of the first GUI reorder shortcut 540 may correspond to a circular button on the right side of the first GUI reorder shortcut 540. A user selection of this circular button may trigger an automatic order for the item. The shortcut page 530 may include a script, such as a JavaScript, that executes based on the user selection. The script may update the presentation of the first GUI reorder shortcut 540 in the modal window to present the status 550 as a graphic overlaid at a particular location over the first GUI reorder shortcut 540.

This script may further be executed, or another one included in the shortcut page 530 may also be executed, based on the presentation update and/or the dismissal of the modal window. Upon this script execution, the presentation of the second GUI reorder shortcut 560 can also be updated to present the same status, for instance, as a graphic overlaid at the same particular location over the second GUI reorder shortcut 560.

In addition, upon the user selection of the circular button on the first GUI reorder shortcut 540 and/or the second GUI reorder shortcut 560 and the resulting request for an automatic order, the user account may be updated to indicate that the item was automatically reordered. The update may allow the synchronization of the presentation of the item's GUI reorder shortcut in a subsequent refresh of the shortcut page 530 or a new page, as further illustrated in the next figure.

Although FIG. 5 illustrates presenting the status 550 based on user interaction with the GUI reorder shortcut 540, other triggers may be used to trigger the presentation of the status 550. For example, a user order for the item through a regular checkout process (e.g., adding the item to a virtual cart and proceeding to and through a checkout web page) may update the user account to show status information (e.g., quantity of the item, delivery address, deliver date, and the like). This status information may be presented as the status 550 upon the presenting the GUI reorder shortcut 540 and before any user interaction therewith.

Figure 6:
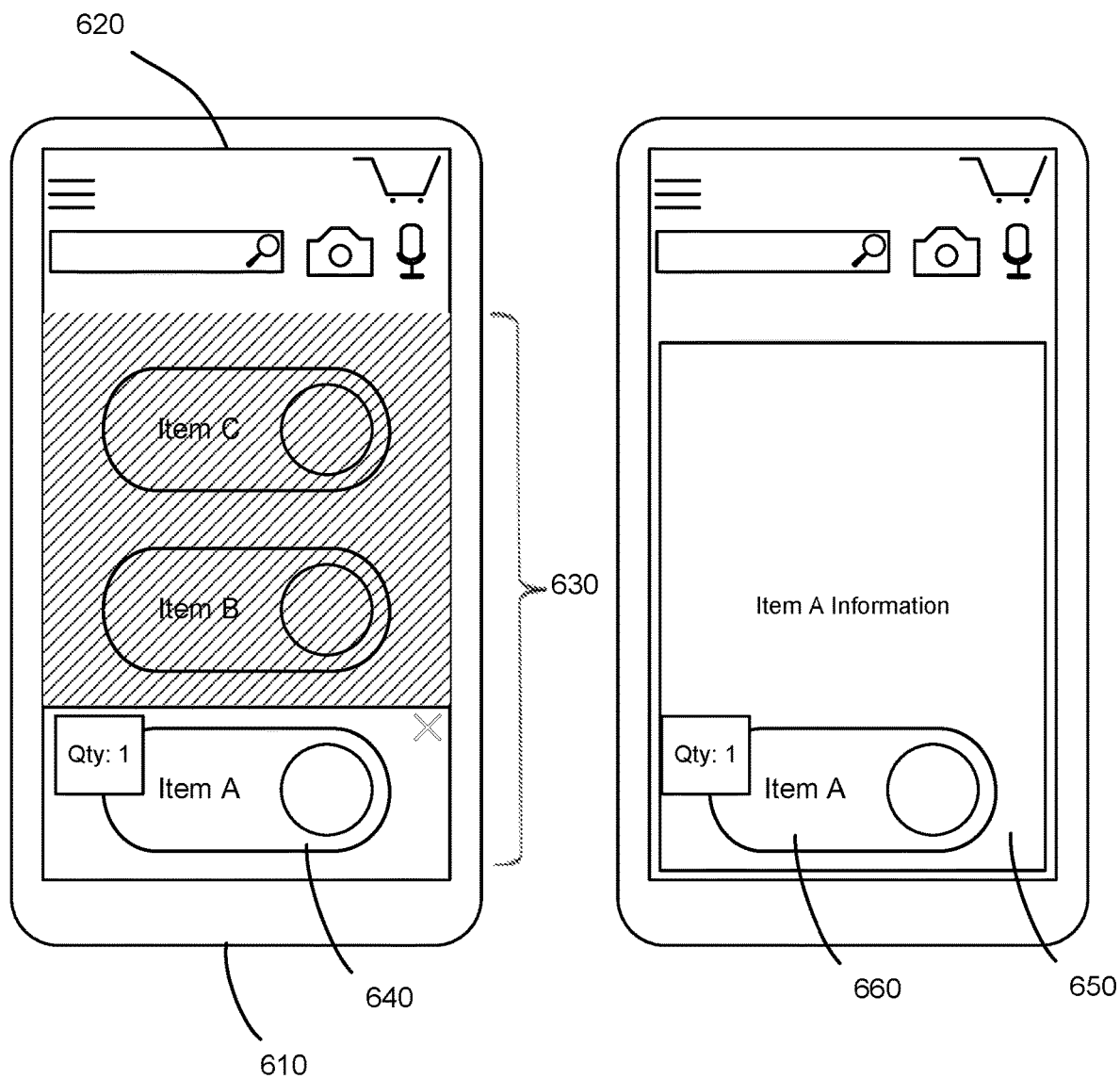
FIG. 6 illustrates an example user interface that presents a web page showing a status of an action triggered based on a selection of a GUI object, according to an embodiment of the present disclosure.

FIG. 6 illustrates an example user interface that presents a web page showing a status of an action triggered based on a selection of a GUI object, according to an embodiment of the present disclosure. As illustrated, a user device 610 may include a GUI 620 that presents a shortcut page 630. The shortcut page 630 may include a main window and a modal window. A first GUI reorder shortcut 640 associated with an item may be presented and actionable in the modal window. Upon a specific user interaction with the first GUI reorder shortcut 640 (e.g., a user interaction with the circular button of this shortcut 640), an action may be automatically triggered (e.g., a request to place an order for the item) and the presentation of the first GUI reorder shortcut 640 may be updated in the modal window, based on an execution of a script from the shortcut page 630, to indicate a status of this action (e.g., to show that a particular quantity of the item was automatically ordered).

In an example, the order history in the user account may also be updated to reflect the status of this action (e.g., to indicate the automatic reorder of the item). This update may be used to synchronize a subsequent presentation of the item's GUI reorder shortcut in a refreshed web page or a new web page at the GUI. For instance, upon the presentation of the item's GUI reorder shortcut in a new page 650, the presentation of the item's GUI reorder shortcut (shown as a second GUI reorder shortcut 660 in a new web page 650) may be updated to also present the status (e.g., to show that the particular quantity of the item was automatically ordered). In this case, the new web page 650 may point to and present a particular source image of the second GUI reorder shortcut 660, where this source image may include the graphic for the status (e.g., showing that the particular quantity of the item was ordered). In comparison and referring back to FIG. 5, a script is executed to synchronize the presentation of GUI reorder shortcuts in the modal and main windows. Here, a new source image is used to update the presentation of a previously actioned GUI reorder shortcut in a refreshed or a new web page. A similar approach may be used upon a refresh of the shortcut page 630 (e.g., based on a new web request for this page 630, the web server may return a refreshed shortcut page that uses the new source image).

Figure 7:
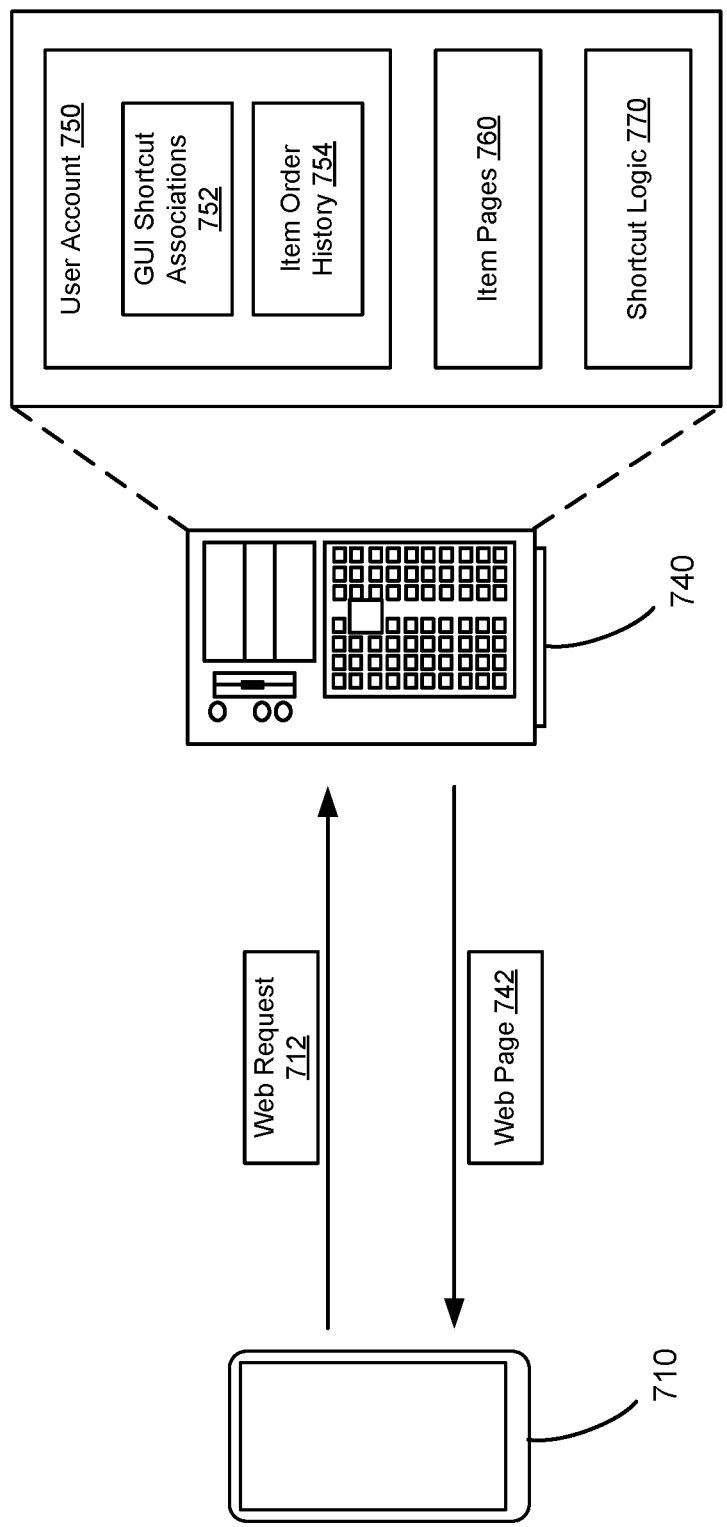
FIG. 7 illustrates an example network environment for navigating to a page presenting GUI objects, according to an embodiment of the present disclosure.

FIG. 7 illustrates an example network environment for navigating to a page presenting GUI objects, according to an embodiment of the present disclosure. As illustrated, the network environment may include a user device 710 of a user and a computer system 740 of a service provider. The user device 710 and the computer system 740 may be communicatively connected over a data network (not shown), such as one including a public network (e.g., the Internet). The user device 710 may send a web request 712 to the computer system 740 over the data network. In response, the computer system 740 may send a web page 742 for presentation on a GUI of the user device 710. Sending a web page may include sending content, such as HTML code, to a browser of a user device for rendering by the browser as a web page in a GUI of the user device.

In an example, the user device 710 may be any computing device suitable to receive user interactions of the user and to communicate with the computer system 740 over the data network. For instance, the user device 710 may be a mobile phone, a smart phone, a tablet, a laptop, a desktop computer, or any other suitable computing device.

The computer system 740 may include one or more computing resources suitable for communication with the user device 710 over the data network and for providing web based computing services. For instance, the computer system 740 may include a web server implemented as a hardware server in a data center or implemented as a set of virtual machines hosted on hardware of the data center. The services may include hosting a web site that offers items and allows purchases of such items and providing web pages of the web site to the user device 710, where some of the web pages may be shortcut pages and/or may present GUI reorder shortcuts.

As illustrated, the computer system 740 may maintain in, for instance, a data store a user account 750 associated with the user of the user device 710. The user account may include, among other things, GUI reorder shortcut associations 752 and an item order history 754. The GUI reorder shortcut associations 752 may indicate that the user has added GUI reorder shortcuts to the user account 750 and may indicate the corresponding items and the related actions and their parameters (e.g., an automatic action to order an item, the size of the item, the quantity of the item, etc.). The item order history 754 may indicate the history of orders of previously obtained items from the service provider.

In addition, the computer system 740 may maintain in, for instance, the data store item pages 760. Each item page may provide details about an item, such as a description of the item, a price of the item, user reviews of the item, and the like. A web server of the computer system 740 may use the item pages 760 to generate and send to the user device 710 web pages describing the items and providing functionalities to obtain the items.

Further, the computer system 740 may host and execute shortcut logic 770. This logic 770 may be implemented as a software module on a computing hardware of the computer system 740 or as specialized computing hardware. The shortcut logic 770 may be executed to determine items of interest to the user based on the GUI reorder shortcut associations 752 and the item order history 754 from the user account 750, to generate a shortcut page containing GUI reorder shortcuts for these items of interest, generate and send a GUI element to the user device 710 identifying one or more of the items of interest and linked to the shortcut page, and send the shortcut page to the user device 710.

Figure 8:
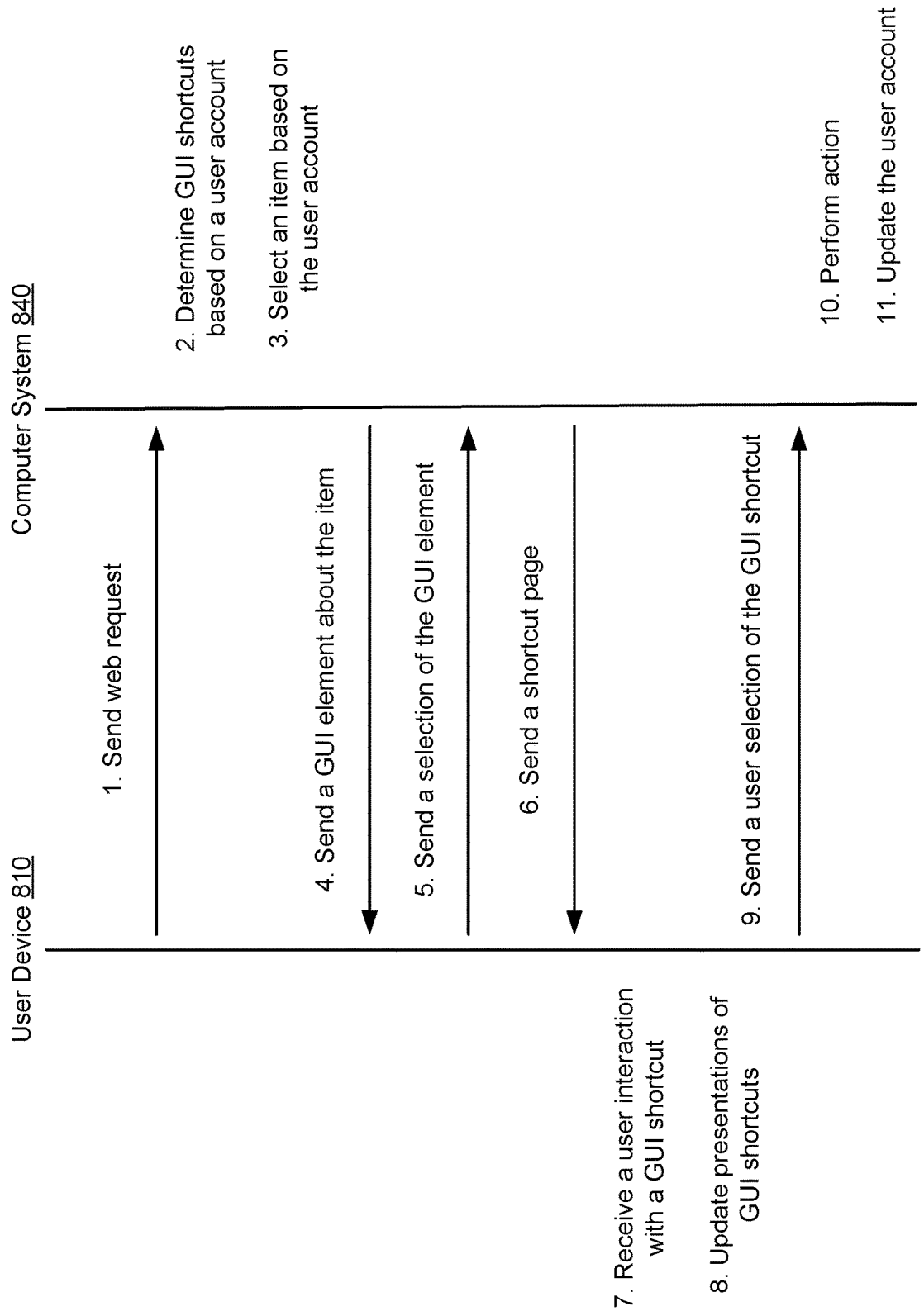
FIG. 8 illustrates an example data exchange within a network environment for navigating to a page presenting GUI objects, according to an embodiment of the present disclosure.

FIG. 8 illustrates an example data exchange within a network environment for navigating to a page presenting GUI objects, according to an embodiment of the present disclosure. As illustrated, the network environment may include a user device 810 of a user and a computer system 840 of a service provider, similar to the user device 710 and computer system 740 of FIG. 7. The data exchange may follow a particular sequence, whereby a shortcut page may be sent from the computer system 840 and presented at the user device 810.

In an example, the user device 810 may send a web request to the computer system. The web request may be associated with an access of the user device 810 to a web site hosted by the computer system 740. For instance, the web request may identify a particular web page of the web site (e.g., a home page).

In response, the computer system 840 may determine GUI reorder shortcuts based on a user account of the user. In an example, the computer system may determine the user account based on a login of the user to the user account at the web site. Additionally or alternatively, the user account may be determined from a cookie associated with a browser on the user device 810. The computer system 840 may determine the GUI reorder shortcuts available to the user from the user account and the associated items. These items may already be ranked or, based on the web request, may be ranked according to a potential level of interest of the user. The computer system 840 may generate a shortcut page that includes all or a subset of the GUI reorder shortcuts. In a particular example, the subset may be based on the ranking. In another example, the subset may be random or may be based on cycling through the GUI reorder shortcuts over time.

The computer system 840 may select one of the items based on the user account. For instance, this item may be associated with a GUI reorder shortcut and, based on the item order history, may be of interest to the user. The computer system 840 may generate a GUI element about this item. For instance, the GUI element may identify the item when presented, and may be linked to the shortcut page, where the link may include the URL of the web page and may append an ID of the item to the URL.

The computer system 840 may send the GUI element to the user device 810 for presentation thereat. For instance, the requested web page may be sent to the user device 810 and the GUI element may be shown in a space of the web page. As described herein above, the GUI element may also be sent to the user device 810 as a notification.

The user device 810 may send a selection of the GUI element to the computer system 840. For instance, upon presenting the GUI element 810, the user device 810 may receive a user selection of the GUI element 810. This user selection may trigger a web request to the URL of the shortcut page based on the link between the GUI element and the shortcut page. The computer system 840 may receive this web request, identify the shortcut page based on the URL, and identify the item based on the ID.

In response, the computer system 840 may send the shortcut page to the user device 810. In turn, the user device 810 may present the shortcut page, where the presentation may follow a particular layout. This layout may show the subset of GUI reorder shortcuts in a main window and the item's GUI reorder shortcut in a modal window.

Next, the user device 810 may receive a user interaction with the GUI reorder shortcut in the modal window. Upon this interaction, the user device 810 may execute a script from the web page. The execution of the script may update the presentation of the GUI reorder shortcuts. In particular, the presentation of the item's GUI reorder shortcut in the modal window may be updated to show a status of performing an action (e.g., that the item was automatically reordered). If the main window also presents the item's GUI reorder shortcut, the presentation of this shortcut may be similarly updated to also show the status. Similar presentation updates may be performed for presenting a modal window with information about the item, for dismissing the modal window, and the like as described herein above in connection with FIGS. 1-6.

Upon a user interaction(s) with the item's GUI reorder shortcut in the modal window and/or any other presented GUI reorder shortcut in the main window, the user device 810 may send a user selection of the applicable GUI reorder shortcut(s) to the computer system 840. This selection may be sent as a web request identifying the associated item(s), the user account, and/or the GUI reorder shortcut(s). The computer system 840 may receive this request and may perform one or more predefined actions according to the parameters defined in the user account (e.g., by sending a request, such as a purchase order, identifying an applicable item to a production system of the service provider, where the production system may include processing the item for delivery to the user). The computer system 840 may also update the user account to show the status of the action. This updated information may be subsequently used in the presentation of the applicable GUI reorder shortcut(s) in a new web page or a refreshed shortcut page on the user device 810.

Figure 9:
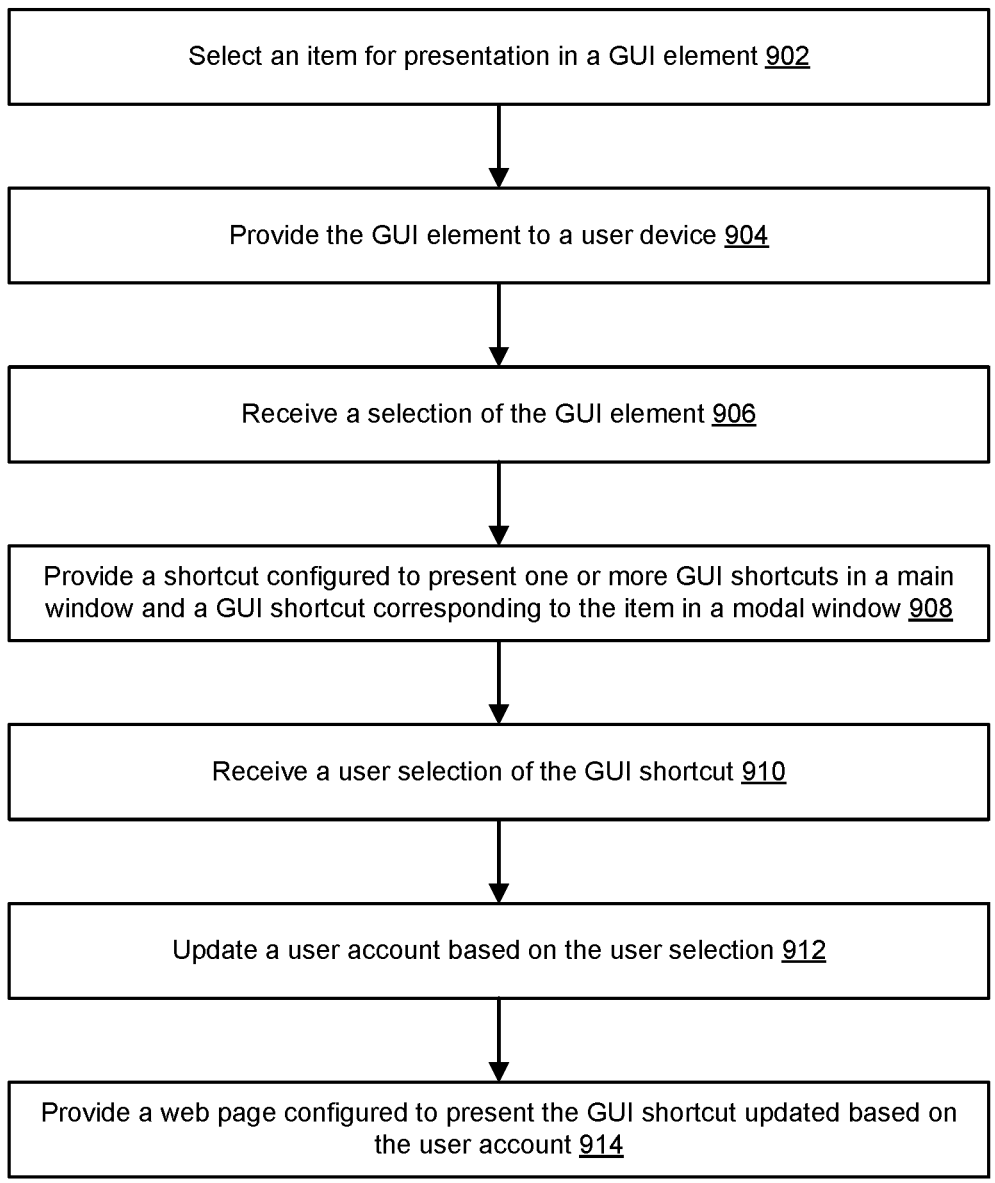
FIG. 9 illustrates an example flow for navigating to a page presenting GUI objects, according to an embodiment of the present disclosure.

FIG. 9 illustrates an example flow for navigating to a page presenting GUI objects, according to an embodiment of the present disclosure. A computer system of a service provider, similar to the computer systems 740 and 840 of FIGS. 7-8, is described as performing operations of the flows. Instructions for performing the operations can be stored as computer-readable instructions on non-transitory computer-readable media of the computer system. As stored, the instructions represent programmable modules that include code executable by one or more processors of the computer system and data usable in the execution and/or resulting from the execution of the code. The execution of such instructions configures the computer system to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, and/or reordered.

The example flow may start at operation 902, where the computer system may select an item for presentation in a GUI element. In an example, the item may be selected based on a user account of a user. In particular, the user account may identify multiple GUI reorder shortcuts, each associated with an item and may include a history of previously obtained items. At time intervals (e.g., on a daily or weekly basis) or based on a web request from a user device associated with the user item, levels of interest of the user in the items may be determined based on the GUI reorder shortcuts and the order histories. The item may be selected based on the corresponding level of interest falling over an interest threshold. For instances, if the item was previously obtained and has an upcoming expiration date, is estimated to have been consumed to a level below a threshold, or its frequency of past purchases indicates that the user may likely be obtaining it again within a next time frame, the computer system may select this item.

At operation 904, the computer system may provide the GUI element to the user device. In an example, the computer system may generate the GUI element, where this element may identify the item and may be linked to a shortcut page. This shortcut page may include all or a subset of the GUI reorder items of the user. If a subset of these shortcuts is included, this subset may be selected based on the levels of interest of the user, randomly, or based on a cycling of the user's GUI reorder shortcuts. The link may include the URL of the shortcut page and may append an ID of the item to the URL. The GUI element may be sent to the user device for presentation in a web page or in a notification.

At operation 906, the computer system may receive a selection of the GUI element. In an example, based on a user interaction with the GUI element at the user device, the user device may send the selection to the computer system. This selection may be received as a web request identifying the URL of the shortcut page and including the ID of the item.

At operation 908, the computer system may provide the shortcut page to the user device based on the selection. In an example, the shortcut page may be the web page that is defined based on a DOM. The DOM may define a main window and a modal window. The main window may present the subset of the GUI reorder shortcuts. The modal window may present the item's GUI reorder shortcut.

At operation 910, the computer system may receive a user selection of the GUI. In an example, based on a user interaction with a GUI reorder shortcut(s) in the modal window and/or in the main window upon dismissal of the modal window, the user device may send the selection of the shortcut(s) to the computer system. This selection may be received as a web request identifying the item(s), the user account, and/or the GUI reorder shortcut(s).

At operation 912, the computer system may update the user account based on the user selection. In an example, the computer system may trigger the applicable action(s) (e.g., by sending a request(s) ordering the associated item(s) to a production system), receive updated information from the production system about the action(s), and update the user account accordingly. In this way the order history may be updated and the status of the item reorder may be maintained in the user account.

At operation 914, the computer system may provide a web page to the user device, where this web page may be configured to present a GUI reorder shortcut updated based on the user account. In an example, the update to the user account may indicate that the item was reordered. Upon a web request from the user device for information about this item, the computer system may provide the web page to the user device. This web page may indicate that the item was ordered and may include the item's GUI reorder shortcut. The presentation of this shortcut in the web page may show the status of the item reorder, where this status may be based on the user account.

Figure 10:
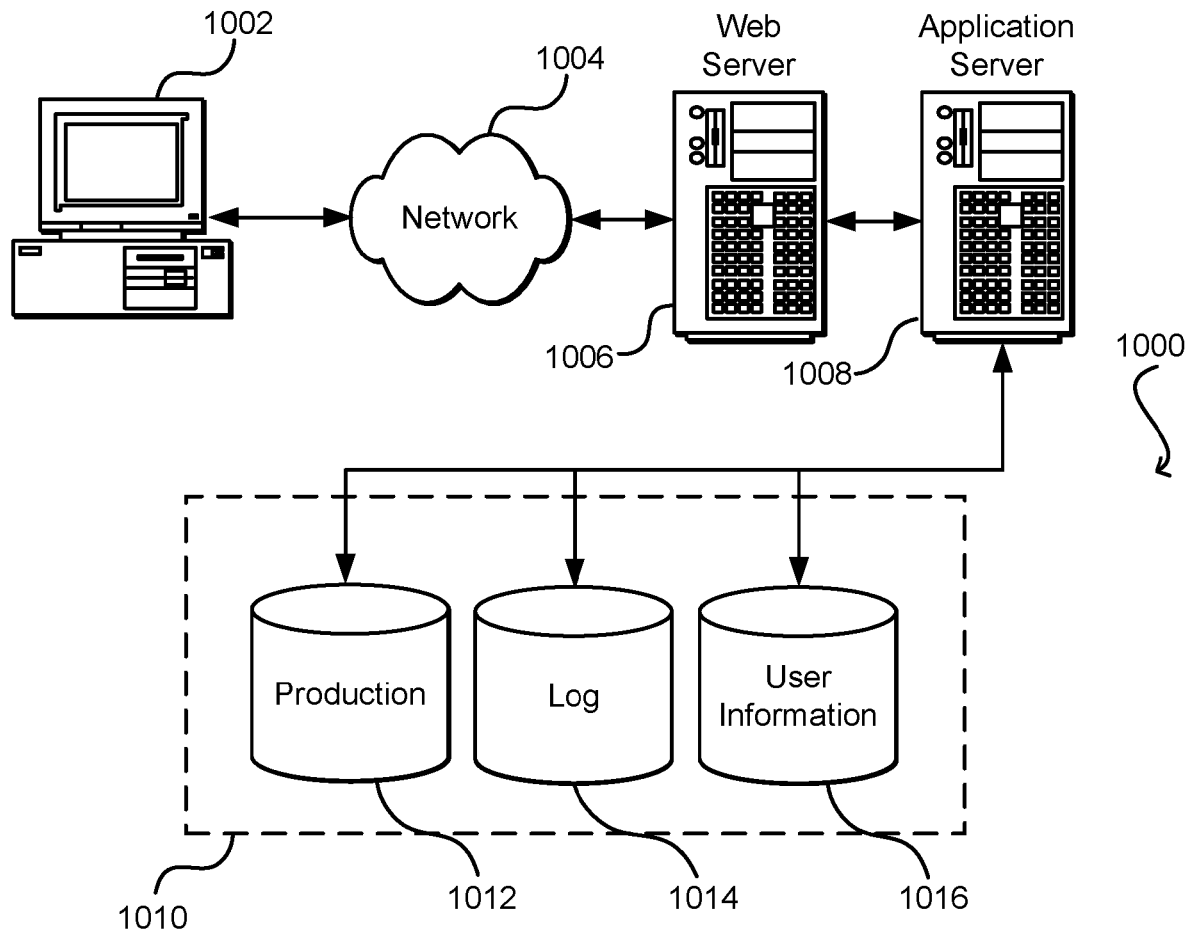
FIG. 10 illustrates a computer architecture diagram showing an example computer architecture, according to an embodiment of the present disclosure.

FIG. 10 illustrates a computer architecture diagram showing an example computer architecture, according to an embodiment of the present disclosure. This architecture may be used to implement some or all of the systems described herein. The computer architecture shown in FIG. 10 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000. The mass storage device 1018 might also store other programs and data not specifically identified herein.

In one embodiment, the mass storage device 1018 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10. It should also be appreciated that many computers, such as the computer 1000, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by a computer system of a service provider, the method comprising:
   receiving, from a user device associated with a user account, a web request for information about one or more items from a web site of the service provider;
   determining graphical user interface (GUI) objects based at least in part on the user account, the user account associating the GUI objects with previously ordered items, a GUI object comprising a selectable control to trigger a reorder of an associated item;
   providing, to the user device for presentation in a GUI, a first web page configured to present the information and a GUI element about a previously ordered item, the GUI element linked to a second web page;
   receiving, from the user device, a selection of the GUI element; and
   providing, to the user device for presentation in the GUI, the second web page based at least in part on the selection, the second web page configured to:
      present the GUI objects in a main window,
      overlay a modal window over at least a portion of the main window, the modal window configured to present a first GUI object corresponding to the previously ordered item, disable the main window, and hide a second GUI object that is in the main window and that corresponds to the previously ordered item, and
      dismiss, based at least in part on a user interaction, the modal window, the dismissing causing the main window to be enabled and the second GUI object to be presented.

2. The method of claim 1, wherein the second web page comprises a script and is further configured to:
   update a first presentation of the first GUI object in the modal window based at least in part on a first user interaction with a first selectable control from the first GUI object; and
   update a second presentation of the second GUI object based at least in part on an execution of the script and the first presentation of the first GUI object, wherein the execution of the script is based at least in part on the first user interaction, and wherein the second presentation is shown in the main window based at least in part on the dismissing of the modal window.

3. The method of claim 2, further comprising:
   updating the user account to include update information based at least in part on the first user interaction with the first selectable control from the first GUI object; and
   providing, to the user device for presentation in the GUI, a third web page configured to present a third GUI object corresponding to the previously ordered item, wherein a presentation of the third GUI object in the third web page is based at least in part on the update information.

4. The method of claim 1, further comprising:
   receiving, from the user device, a second web page request for the second web page based at least in part on the selection of the GUI element, wherein the second web page request comprises a uniform record locator (URL) of the second web page and an identifier of the previously ordered item, wherein the identifier is appended to the URL; and
   selecting the first GUI object for presentation in the modal window based at least in part on the identifier of the previously ordered item.

5. A computer system, comprising:
   one or more processors; and
   one or more computer-readable storage media comprising instructions that, upon execution by the one or more processors, cause the computer system to:
      provide, to a user device for presentation in a graphical user interface (GUI), a GUI element about an item and linked to a page, the user device associated with a user account; and
      provide, to the user device for presentation in the GUI, the page based at least in part on a selection of the GUI element, the page configured to:
         present one or more GUI objects in a main window, the one or more GUI objects associated with one or more items based at least in part on the user account,
         overlay a modal window over at least a portion of the main window, the modal window configured to present a GUI object corresponding to the item, and
         dismiss, based at least in part on a user interaction, the modal window to enable the main window.

6. The computer system of claim 5, wherein the page is a web page from a web site of a service provider, wherein the GUI object is a GUI reorder object for reordering the item from the service provider, and wherein the GUI element is provided in another web page of the service provider based at least in part on a web request from the user device for item information.

7. The computer system of claim 5, wherein the GUI element is provided in a notification to the user device.

8. The computer system of claim 5, wherein the execution of the instructions further causes the computer system to select the item from previously ordered items based at least in part on an order history of the item, wherein the user account stores the order history and associates the previously ordered items with the one or more GUI objects, and wherein the GUI element is provided based at least in part on the item being selected.

9. The computer system of claim 5, wherein the execution of the instructions further causes the computer system to select previously ordered items based at least in part on order histories from the user account, wherein the page is further configured to present the one or more GUI objects in the main window based at least in part on the user account associating the previously ordered items with the one or more GUI objects.

10. The computer system of claim 5, wherein the one or more GUI objects in the main window comprise a second GUI object corresponding to the item, and wherein the modal window hides the second GUI object.

11. The computer system of claim 5, wherein the GUI object is configured to initiate an action related to the item based at least in part on a user selection of the GUI object, wherein the page is further configured to update a presentation of the GUI object in the modal window based at least in part on the user selection or on a previous action initiated by a user and related to the item, wherein the updating indicates a status of the action.

12. The computer system of claim 11, wherein the page is further configured to synchronize a presentation of a second GUI object in the main window with the presentation of the GUI object in the modal window to also indicate the status of the action.

13. The computer system of claim 11, wherein the execution of the instructions further causes the computer system to update the user account with updated information about the action.

14. The computer system of claim 13, wherein the execution of the instructions further causes the computer system to provide a different page to the user device for presentation in the GUI, wherein the different page is configured to present the GUI object based at least in part on the updated information.

15. The computer system of claim 5, wherein the page is further configured to present an identifier of the item in the GUI object and to present an additional modal window comprising information about the item based at least in part on a user selection of the identifier in the GUI object.

16. One or more computer-readable storage media storing instructions that, upon execution on a computer system, cause the computer system to perform operations comprising:
providing, to a user device for presentation in a graphical user interface (GUI), a GUI element about an item and linked to a page, the user device associated with a user account; and
providing, to the user device for presentation in the GUI, the page based at least in part on a selection of the GUI element, the page configured to:
present one or more GUI objects in a main window, the one or more GUI objects associated with one or more items based at least in part on the user account,
overlay a modal window over at least a portion of the main window, the modal window configured to present a GUI object corresponding to the item, and
dismiss, based at least in part on a user interaction, the modal window to enable the main window.

17. The one or more computer-readable storage media of claim 16, wherein each of the one or more GUI objects in the main window and the GUI object in the modal window is configured to initiate a reorder of a corresponding item based at least in part on the user account.

18. The one or more computer-readable storage media of claim 17, wherein the GUI object is associated with a predefined action, wherein the page is further configured to update a presentation of the GUI object in the modal window based at least in part on a user selection of the GUI object, wherein the updating indicates that the predefined action was performed.

19. The one or more computer-readable storage media of claim 18, wherein the modal window is dismissed based at least in part on the user interaction with a dismissal option in the modal window, wherein the page is further configured to present in the main window a second GUI object indicating that the item was reordered.

20. The one or more computer-readable storage media of claim 16, wherein the overlay of the modal window allows a presentation of a second GUI object in the main window, and the second GUI object becomes selectable in the main window based at least in part on the dismissing of the modal window.

* * * * *